USzh005696513A

United States Patent [19]
Song

[11] Patent Number: 5,696,513
[45] Date of Patent: Dec. 9, 1997

[54] SIGNAL TRANSMITTING APPARATUS

[75] Inventor: Jae-Kwan Song, Kyonggi-do, Rep. of Korea

[73] Assignee: Hyundai Electronics Industries Co., Ltd., Rep. of Korea

[21] Appl. No.: 740,633

[22] Filed: Oct. 31, 1996

[30]   Foreign Application Priority Data

Dec. 22, 1995 [KR] Rep. of Korea ............... 95-54404

[51] Int. Cl.$^6$ ................ G08C 19/12; H04L 17/02
[52] U.S. Cl. .............. 341/176; 348/705; 370/217; 370/242; 371/68.2; 371/20.1; 455/8
[58] Field of Search ............... 348/705; 370/217, 370/218, 242, 244; 371/20.1, 68.1, 68.2; 455/8, 103, 107, 129; 341/176

[56]          References Cited

U.S. PATENT DOCUMENTS

| | | | |
|---|---|---|---|
| 4,680,776 | 7/1987 | Ikeuchi et al. | 375/40 |
| 4,995,042 | 2/1991 | Guthaus et al. | 371/68.2 |
| 5,010,550 | 4/1991 | Hirata | 340/825.03 |

Primary Examiner—Jeffery Hofsass
Assistant Examiner—Timothy Edwards, Jr.
Attorney, Agent, or Firm—David M. Klein; Bryan Cave LLP

[57]          ABSTRACT

An apparatus for transmitting a signal which is capable of connecting an N-number of main lines and one auxiliary line using an N-number of transmission switches (N denotes 1, 2, 3, . . . , n), thus more effectively transmitting a signal, which includes first and second input terminals selectively connected to first and second output terminals in accordance with normal/error control signals, with transmission line signal being applied to the first input terminals of the SPDT transmission switches, and with an auxiliary line signal being applied to the second input terminal of the last SPDT transmission switch; first output terminals of the transmission switches connected to an input terminal of a combining terminal; first output terminals of the SPDT transmission switches connected to first input terminals of the SPDT transmission switches; and a load resistor connected to the second output terminal of the first SPDT transmission switch.

1 Claim, 2 Drawing Sheets

(Coventional Art)

SIGNAL TRANSMITTING APPARATUS

BACKGROUND OF THE INVENTION

1. Field of the Invention

The present invention relates to an apparatus for transmitting a signal, and particularly to an improved apparatus for transmitting a signal which is capable of connecting an N-number of main lines and one auxiliary line using an N-number of transmission switches (N denotes 1, 2, 3, . . . , n), thus more effectively transmitting a signal.

2. Description of the Conventional Art

A signal transmitting apparatus which is directed to transmitting a predetermined signal such as a broadcast signal and the like is unable to transmit the signal when a failure occurs in a signal transmission line.

Therefore, in such as a signal transmitting apparatus, there are provided more than one auxiliary lines for disconnecting the transmission line of the signal when a failure occurs in a transmission line and the like. When there occurs a failure in the transmission line, a predetermined signal can be continuously transmitted by using the auxiliary line.

FIG. 1 is a block diagram of the construction of a conventional apparatus for transmitting a signal. In the drawings, reference numerals 11~1N denotes a switching unit for switching transmission line signals $TX_1$ through $TX_N$, reference character 1N+1 denotes an auxiliary switching unit for switching an auxiliary line signal $SX_1$, reference numeral 21 denotes a combining unit for combining the output signals of the switching units 11~1N and the auxiliary switching unit 1N+1 and for outputting it to an antenna $ANT_1$.

In the above-mentioned conventional signal transmitting apparatus, the signals of the first through n-th transmission line lines is inputted into the combining unit 21 through the switching units 11~1N and is combined thereby, and the combined signals are outputted to the antenna $ANT_1$.

Here, since the auxiliary switching unit 1N+1 is not operated, an auxiliary signal $SX_1$ is not inputted thereto.

In this state, if a predetermined error occurs in the system which is directed to processing a signal $TX_1$ or signals $TX_2$~$TX_N$ among the transmission line signals $TX_1$~$TX_N$, the signal $TX_N$ or signals $TX_2$~$TX_N$ are changed to the auxiliary line signal $SX_1$.

In addition, in the conventional signal switching system, the operation of the switching unit 11 or the switching units 12~1N for switching one signal $TX_1$ or signals $TX_2$~$TX_N$ is terminated, and the auxiliary switching units 1N+1 are operated.

The signal $TX_1$ or the signals $TX_2$~$TX_N$ of the system in which the error did not occur are selectively passed through the switching units 11~1N, and the auxiliary line signal $SX_1$ which converted the signal of the system in which an error occurred passes through the auxiliary switching unit 1N+1. The signals passed through the switching units 11~1N and the auxiliary switching unit 1N+1 are combined by the combining unit 21 and are transmitted through the antennal $ANT_1$.

However, in the conventional apparatus for transmitting a signal, one auxiliary switching unit 1N+1 should be provided for switching the auxiliary line signal $SX_1$ instead of the switching units 11~1N for switching the transmission line signals $TX_1$~$TX_N$. In addition, the switching unit in which the error occurred and its operation is stopped becomes a unloaded state, thus causing a damage of the system.

SUMMARY OF THE INVENTION

Accordingly, it is an object of the present invention to provide an apparatus for transmitting a signal which overcomes the problems encountered in the conventional apparatus for transmitting a signal.

It is another object of the present invention to provide an apparatus for transmitting a signal which is capable of connecting an N-number of main lines and one auxiliary line using an N-number of transmission switches (N denotes 1, 2, 3, . . . , n), thus more effectively transmitting a signal.

To achieve the above objects, there is provided an apparatus for transmitting a signal, which includes first and second input terminals selectively connected to first and second output terminals in accordance with normal/error control signals, with transmission line signal being applied to the first input terminals of the SPDT transmission switches, and with an auxiliary line signal being applied to the second input terminal of the last SPDT transmission switch; first output terminals of the transmission switches connected to an input terminal of a combining terminal; first output terminals of the SPDT transmission switches connected to second input terminals of the SPDT transmission switches; and a load resistor connected to the second output terminal of the first SPDT transmission switch.

Additional advantages, objects and other features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The construction of the signal transmission apparatus according to the present invention will now be described with reference to FIG. 2.

Figure 1:
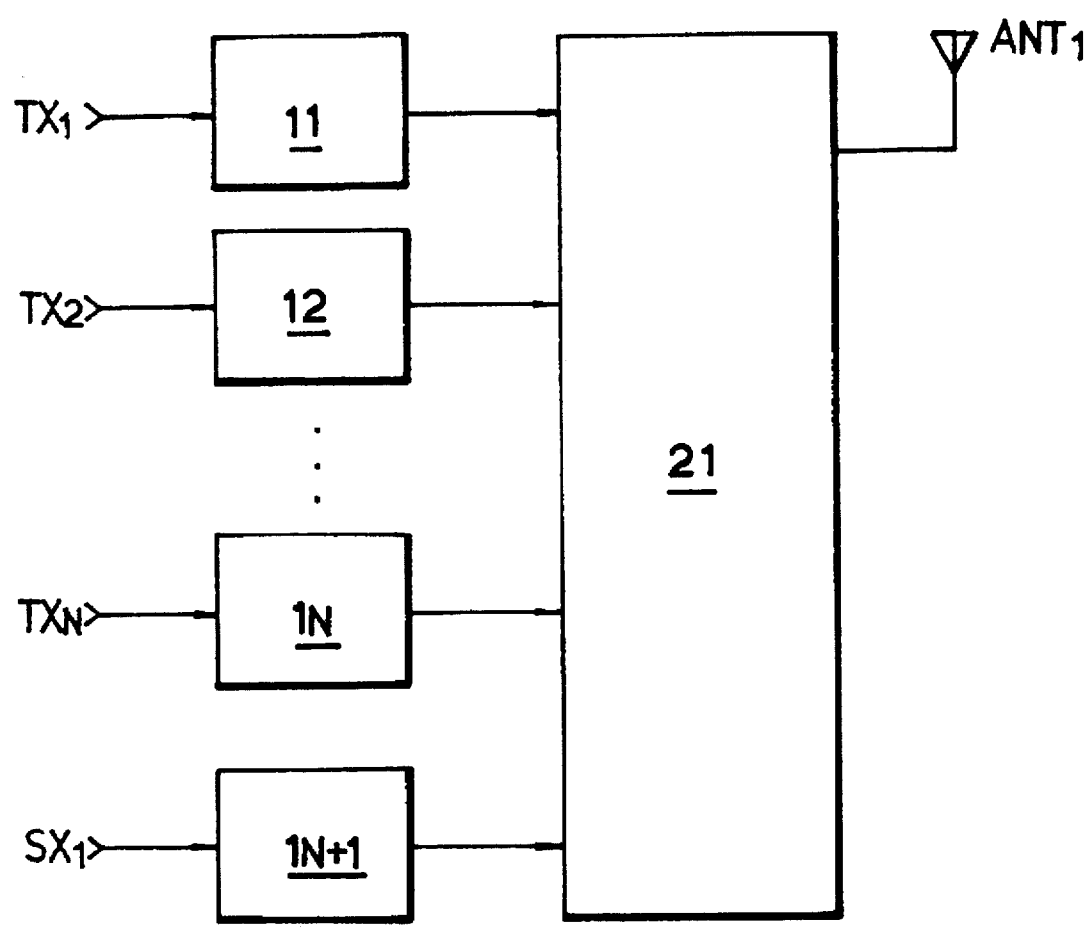
FIG. 1 is a block diagram of the construction of a conventional apparatus for transmitting a signal.
Figure 2:
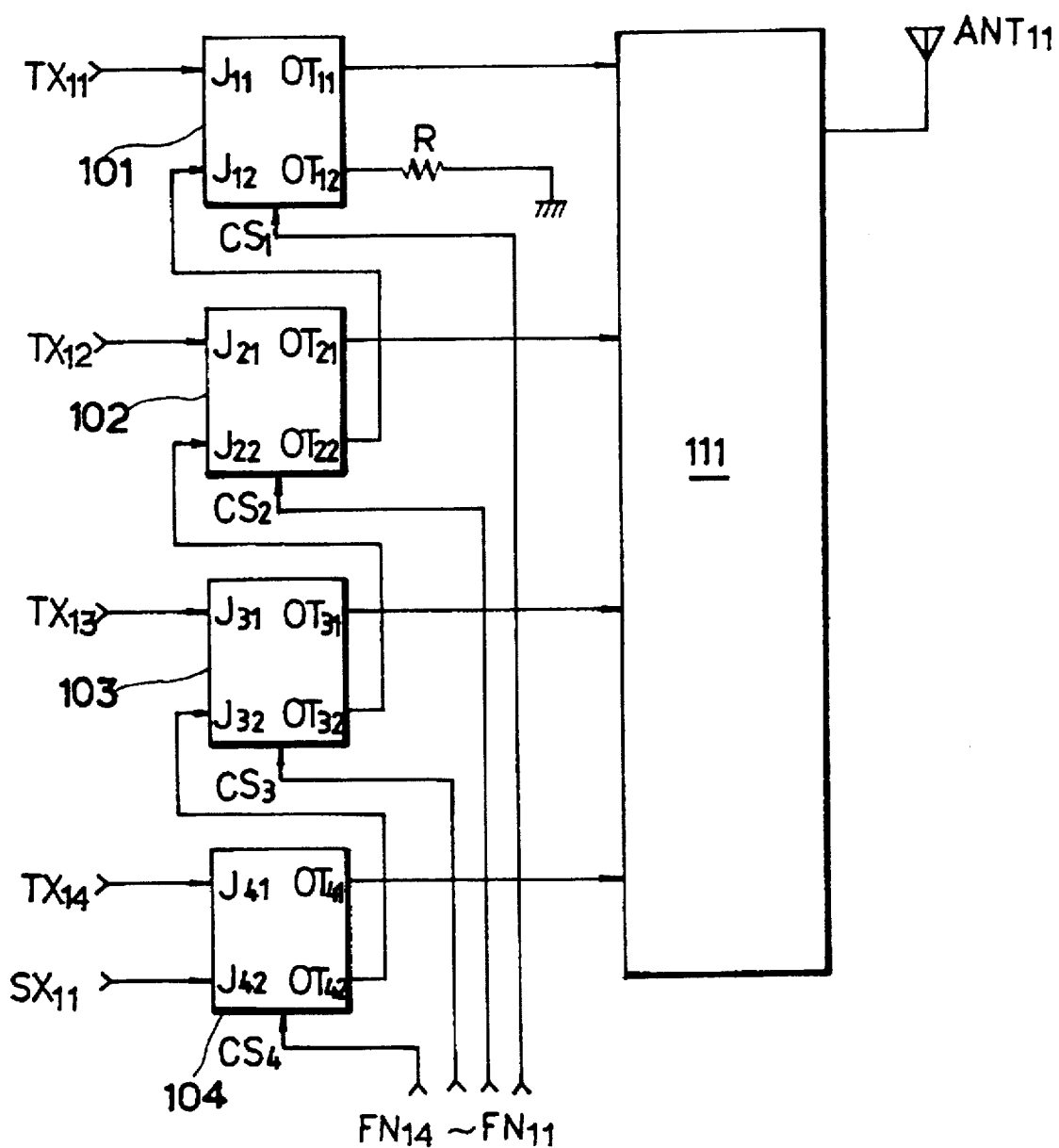
FIG. 2 is a block diagram of the construction of an apparatus for transmitting a signal according to the present invention.

FIG. 2 is a block diagram of the construction of an apparatus for transmitting a signal according to the present invention. As shown therein, transmission line signals $TX_{11}$ through $TX_{14}$ are applied to input terminals $J_{11}$ through $J_{41}$ of SPDT transmission switches 101 through 104 for selectively connecting first and second input terminals $J_{11}$ through $J_{41}$ and $J_{12}$ through $J_{42}$ in accordance with normal/error control signals $FN_{11}$ through $FN_{14}$. First output terminals $OT_{11}$ through $OT_{41}$ of SPDT transmission switches 101 through 104 are connected to the input terminals of the combining unit 111 by connecting components in order for the auxiliary signal $SX_{11}$ to be applied to the second input terminal $J_{42}$ of the SPDT transmission switch 104. The second output terminals $OT_{42}$ through $OT_{22}$ of the SPDT transmission switches 104 through 102 are connected to the second input terminals $J_{32}$ through $J_{12}$ of the SPDT transmission switches 103 through 101. A load resistor R is connected to the second output terminal $OT_{12}$ of the SPDT transmission switch 101.

In the SPDT transmission switches 101~104, the first and second input terminals $J_{11}$~$J_{41}$ and $J_{12}$~$J_{42}$ are connected to the first and second output terminals $OT_{11}$~$OT_{41}$ and $OT_{12}$~$OT_{42}$ when the normal/error control signals $FN_{11}$~$FN_{14}$ are normally inputted, and the normal/error control signals $FN_{11}$~$FN_{14}$ are erroneously inputted, the first and second input terminals $J_{11}$~$J_{41}$ and $J_{12}$~$J_{42}$ are connected to the second and first output terminals $OT_{12}$~$OT_{42}$ and $OT_{11}$~$OT_{41}$.

In FIG. 2, reference character $ANT_{11}$ denotes the antenna, and reference characters $CS_1$~$CS_4$ denote control terminals of the SPDT transmission switches 101~104.

When the system is normally operated, namely, when error does not occur, the transmission line signals $TX_{11}$~$TX_{14}$ are inputted, and are transmitted to the first input terminals $J_{11}$~$J_{41}$ of the SPDT transmission switches 101~104, and the normal/error control signals $FN_{11}$~$FN_{14}$ are normally applied to the control terminals $CS$~$CS_4$ of the SPDT transmission terminals 101~104.

Therefore, in the SPDT transmission switches 101~104, the first and second input terminals $J_{11}$~$J_{41}$ and $J_{12}$~$J_{42}$ are connected to the first and second output terminals $OT_{11}$~$OT_{41}$ and $OT_{12}$~$OT_{42}$.

The transmission line signals $TX_{11}$~$TX_{14}$ are inputted to the first input terminals $J_{11}$~$J_{41}$ of the SPDT transmission switches 101~104 and are outputted to the first output terminals $OT_{11}$~$OT_{41}$, and are combined by the combining unit 111, and are transmitted through the antenna $ANT_{11}$.

Here, the auxiliary line signal $SX_{11}$ are applied to the load resistor "R" through the second input terminals and output terminals ($J_{42}$, $OT_{42}$), ($J_{32}$, $OT_{32}$), ($J_{22}$, $OT_{22}$), and ($J_{12}$, $OT_{12}$), so that it is possible to prevent damage of the processing unit (not shown) which processes the auxiliary line signal $SX_{11}$.

In this state, if an abnormal state occurs in processing the transmission line signal $TX_{11}$, the auxiliary line signal $SX_{11}$ is processed and inputted, and the normal/error control signal $FN_{11}$ is inputted as an error state.

Therefore, the first input terminal $J_{11}$ of the SPDT transmission switch 101 is connected to the second output terminal $OT_{12}$ in accordance with the normal/error control signal $FN_{11}$, and the second input terminal $J_{12}$ is connected to the first output terminal $OT_{11}$.

The auxiliary line signal $SX_{11}$ are sequentially applied to the second input and output terminals ($J_{42}$, $OT_{42}$), ($J_{32}$, $OT_{32}$), and ($J_{22}$, $OT_{22}$), and are inputted to the combining unit 111 through the second input terminal $J_{12}$ and the first output terminal $OT_{11}$ of the SPDT transmission switch 101.

The transmission line signal $TX_{11}$ is connected to the load resistor "R" through the first input terminal $J_{11}$ and the second output terminal $OT_{12}$ of the SPDT transmission switch 101.

In addition, for example, when there is an error in processing the transmission line signal $TX_{12}$, the auxiliary line signal $SX_{11}$ is processed and inputted, and when the normal/error control signal $FN_{12}$ is erroneously inputted, the first input terminal $J_{21}$ of the SPDT transmission switch 102 is connected to the second output terminal $OT_{22}$ in accordance with the normal/error control signal $FN_{12}$, and the second input terminal $J_{22}$ is connected to the first output terminal $OT_{21}$.

The auxiliary line signal $SX_{11}$ is applied to the second input and output terminals ($J_{42}$, $OT_{42}$), ($J_{32}$, $OT_{32}$) of the SPDT transmission switches 104 and 103, and is inputted to the combining unit 111 through the second input terminal $J_{22}$ and the first output terminal $OT_{21}$ of the SPDT transmission switch 102. The transmission line signal $TX_{12}$ is applied to the first input terminal $J_{21}$ and the second output terminal $OT_{22}$ of the SPDT transmission switch 102, and is connected to the load resistor "R" through the second input terminal $J_{12}$ and the second output terminal $OT_{12}$ of the SPDT transmission switch 101.

In addition, When an error occurs in processing the transmission line signal $TX_{13}$ or $TX_{14}$, the transmission line or $TX_{14}$ in which the error occurred is processed as the auxiliary line signal $SX_{11}$ and inputted, and the normal/error control signal $FN_{13}$ or $FN_{14}$ is inputted as an error, the SPD transmission switch 103 or 104 is switched in accordance with the normal/error control signal $FN_{13}$ or $FN_{14}$, and the transmission line signal $TX_{13}$ or $TX_{14}$ is connected to the load resistor "R", and the auxiliary line signal $SX_{11}$ is connected to the combining unit 111.

Meanwhile, in the above description, an example that four transmission signal signals and one auxiliary line signal are switched to each other is described. So as to implement the objects of the present invention, a plurality of transmission line signals and one auxiliary line signal may be switched, thus continuously transmitting signals without disconnection of the signals.

As described above, a predetermined number of the transmission switches which is the same as the number of the transmission line signals when transmitting a plurality of transmission line signals is equipped with in the present invention, thus transmitting a plurality of transmission line signals and one auxiliary line signal.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. An apparatus for transmitting a signal, comprising:

a combining terminal;

a plurality of SPDT transmission switches, each comprising first and second input terminals selectively connected to first and second output terminals in accordance with normal/error control signals, a transmission line signal being applied to the first input terminal of each SPDT transmission switch, and an auxiliary line signal being applied to the second input terminal of a last SPDT transmission switch, the first output terminal of each SPDT transmission switch connected to an input terminal of the combining terminal, the second output terminal of each SPDT transmission switch connected to the second input terminal of a next SPDT transmission switch; and a load resistor connected to the second output terminal of the first SPDT transmission switch.

* * * * *